United States Patent [19]

Medeiros et al.

[11] Patent Number: 5,666,327
[45] Date of Patent: Sep. 9, 1997

[54] PORTABLE ACOUSTIC TURBULENCE DETECTOR

[75] Inventors: Diane Medeiros, Tiverton; John Oeschger, Kingston, both of R.I.; Peter R. Hebda, Fall River, Mass.

[73] Assignee: The United States of America as represented by the Secretary of the Navy, Washington, D.C.

[21] Appl. No.: 605,233

[22] Filed: Feb. 2, 1996

[51] Int. Cl.⁶ .................................................. H04B 11/00
[52] U.S. Cl. .................................... 367/173; 367/131
[58] Field of Search .................................. 367/153, 165, 367/173, 4, 902, 131; 310/337; 73/170.34

[56] References Cited

U.S. PATENT DOCUMENTS

| | | | |
|---|---|---|---|
| 3,176,263 | 3/1965 | Douglas | 367/117 |
| 3,444,511 | 5/1969 | Morrow | 367/173 |
| 3,742,540 | 7/1973 | Hill et al. | 367/173 |
| 4,152,690 | 5/1979 | Veatch | 367/173 |
| 4,453,238 | 6/1984 | Van Buren | 367/13 |
| 4,881,210 | 11/1989 | Myers et al. | 367/173 |
| 5,022,012 | 6/1991 | Godfrey et al. | 367/173 |
| 5,283,767 | 2/1994 | McCoy | 367/4 |

*Primary Examiner*—Daniel T. Pihulic
*Attorney, Agent, or Firm*—Michael J. McGowan; William F. Eipert; Prithvi C. Lall

[57] ABSTRACT

The present invention relates to a system for studying, identifying and characterizing thermal gradients within a volume of water. The system includes a frame formed from a plurality of PVC tubing sections and connectors. The connectors are used to house at least one pair of acoustic transducers, which transducers are used to collect data for studying, identifying and characterizing the thermal gradients within the volume of water. A number of different frame configurations may be used to perform a number of different studies.

10 Claims, 2 Drawing Sheets

PORTABLE ACOUSTIC TURBULENCE DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE PRESENT INVENTION (1) Field of the Invention

The present invention relates to a system for studying, identifying, and characterizing temperature gradients within a volume of water.

(2) Description of the Prior Art

In order to use acoustics and weak scattering theory to determine the temperature field of a given volume of water, source/receiver pairs of transducers must be located at a known distance from the area to be studied and also must be aligned at a specific angle with respect to each other and the overall coordinate system. Laboratory systems tend not to be practical for field studies because the physical structure of the laboratory system interferes with the environment being studied. Also, the physical size of the components often do not make them practical for deployment by one person. Another disadvantage with laboratory systems is the presence of ground loops in the single shielded BNC cables which are used in the laboratory. When these cables are used in the ocean, ground loops occur because the internal circuit of the transducer is grounded in two places, first at the supporting electronics, and also to earth ground through the outer metal casing of the transducer.

A wide variety of structures have been used in the prior art to deploy sound devices, including acoustic transducers and hydrophones, in a variety of environments including underwater environments. For example, U.S. Pat. No. 3,176,263 to Douglas illustrates a system for measuring and recording the size and shape of solid objects. The Douglas system includes a plurality of microphones placed about and focused on an area of interest. However, Douglas lacks any disclosure of a framework for positioning the microphones.

U.S. Pat. No. 3,444,511 to Morrow discloses an array of transducers supported by a framework formed from a number of hollow plastic tubes. As shown in FIG. 1 of the Morrow patent, the transducers are mounted about the periphery of the framework. U.S. Pat. No. 3,742,540 to Hill et al. shows a passive sonar array mounting and recovery apparatus in which a plurality of transducers are mounted on the ends of hollow metal tubes that are interconnected into a framework.

U.S. Pat. No. 4,152,690 to Veatch discloses an apparatus for mounting an acoustic transducer in connection with a boat to allow the transducer to be moved about beneath the water and thereby scan more than one direction. The apparatus comprises a flexible control cable with a device which actuates it fastened to the cable's upper end. Fastened to the lower end is a pivot mechanism which converts the action of the control cable to a pivotal movement. The pivot mechanism holds a transducer support mount such that the action of the control cable pivots the transducer support mount, preferably, in a vertical plane. The pivot mechanism is connected with the boat such that the pivot mechanism and the transducer it holds are held beneath the water, and preferably, such that the transducer mount can be rotated 360 degrees about the vertical axis, as in a substantially horizontal plane.

U.S. Pat. No. 4,453,238 to Van Buren discloses an apparatus for determining the phase sensitivity of hydrophones. The apparatus includes a frame having a mounting hanger depending therefrom for holding a hydrophone beneath the surface of the water.

U.S. Pat. No. 4,881,210 to Myers et al. discloses another tubular support frame for a transducer that is to be placed in the water. Another frame arrangement is shown in U.S. Pat. No. 4,928,915 to Havins. In this arrangement, a transducer is pivotally mounted at the end of a hollow tube.

U.S. Pat. No. 5,022,012 to Godfrey et al. discloses an acoustic sensing arrangement in which a plurality of hydrophones are mounted at the ends of tubular support arms.

None of these patents however teach the use of a portable temperature gradient measurement apparatus.

SUMMARY OF THE INVENTION

Accordingly, it is an object of the present invention to provide a system for studying, identifying and characterizing temperature gradients in a volume of water.

It is a further object of the present invention to provide a system as above which is portable.

It is yet another object of the present invention to provide a system as above which can be easily erected by a single user.

It is yet another object of the present invention to provide a system as above which will substantially avoid decay in a salt water environment.

The foregoing objects are attained by the system of the present invention.

In accordance with the present invention, a system for studying, identifying and characterizing temperature gradients in a volume of water comprises a frame having a plurality of components, each formed from a lightweight material such as polyvinylchloride, and means for studying, identifying and characterizing the temperature gradients in the volume of water. The studying, identifying and characterizing means comprises at least two sensors, such as acoustic transducers, with each sensor being snugly fitted within a first component of said frame.

The frame of the present invention is advantageous in that it lends itself to a variety of configurations to perform a variety of studies. For example, in a first embodiment, the frame may be constructed such that the acoustic transducers are focused below the frame so that water flow in an area of interest remains unobstructed. In a second embodiment, the frame may have one tubular component, housing a first acoustic transducer, which extends below a scattering volume to one side and a plurality of components, housing other transducers, which are positioned above the scattering volume.

Other details, as well as other advantages and objects, of the present invention are set forth in the following detailed description and the accompanying drawings in which like reference numerals depict like elements.

DETAILED DESCRIPTION OF THE PREFERRED EMBODIMENT(S)

The system of the present invention makes use of a frame formed from polyvinylchloride (PVC) tubing commonly used in plumbing applications By first determining the transducer positioning for the desired experiment, a design can be developed for a, frame for supporting the acoustic transducers needed to study, identify and characterize the temperature gradients in the water volume under study. Any suitable technique known in the art may be used to determine the transducer positioning for the desired experiment. The particular technique which is employed does not form part of the present invention.

After the frame design is determined, the frame is then configured using PVC tubing and plastic connectors and elbows. The support frame is preferably designed so that its presence in the ocean minimally impacts the area under study.

The diameter of the PVC tubing used to form the frame is determined by the size of the transducers involved in the experiment. As well be discussed hereinafter, each of the transducers must fit snugly inside the end of a connector attached to the tubing.

Figure 1:
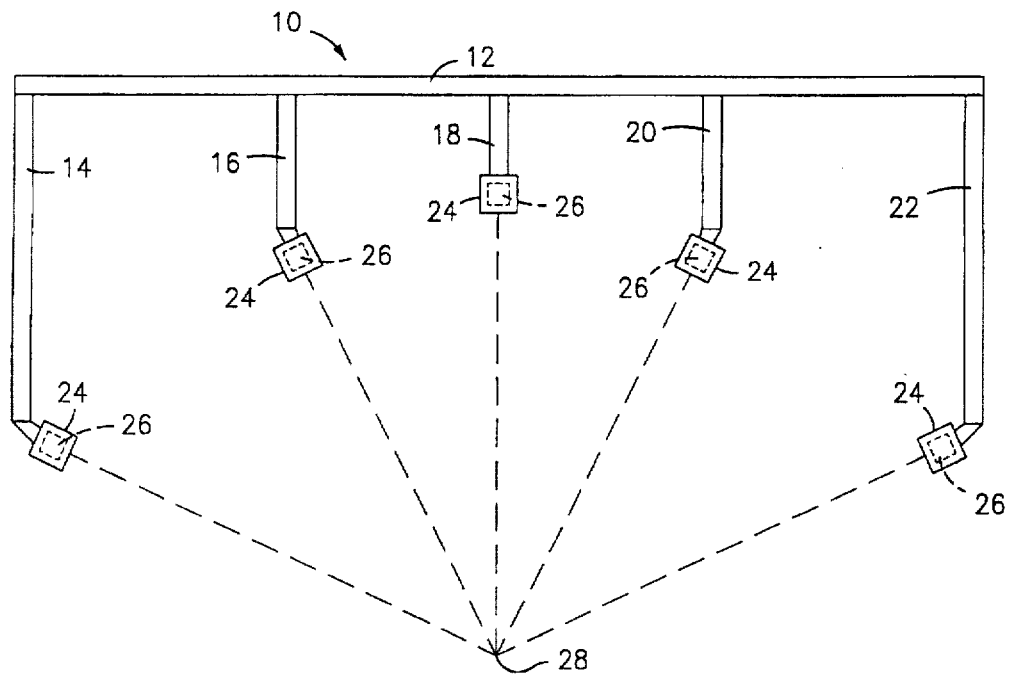
FIG. 1 illustrates a first embodiment of a system for studying, identifying and characterizing the temperature gradients in a volume of water.

Referring now to FIG. 1, a frame 10 is illustrated for studying scattering in a common Bragg direction. The frame 10 comprises a central tubing section 12 formed from one or more sections of PVC tubing and a plurality of arm sections 14, 16, 18, 20, and 22 joined to the central tubing section 12 in a known manner by connectors and elbows (not shown). Preferably, the arm sections 14, 16, 18, 20, and 22 extend perpendicular to the central tubing section 12 Each of the tubing sections 14, 16, 18, 20, and 22 has a connector 24 attached to an end. Each connector 24 is dimensioned so that one acoustic transducer 26 is mounted or housed within the end of the connector 24 Preferably the transducers 26 are focussed at a common point 28 below the frame 10 so that water flow in the area of interest remains unobstructed.

Figure 2:
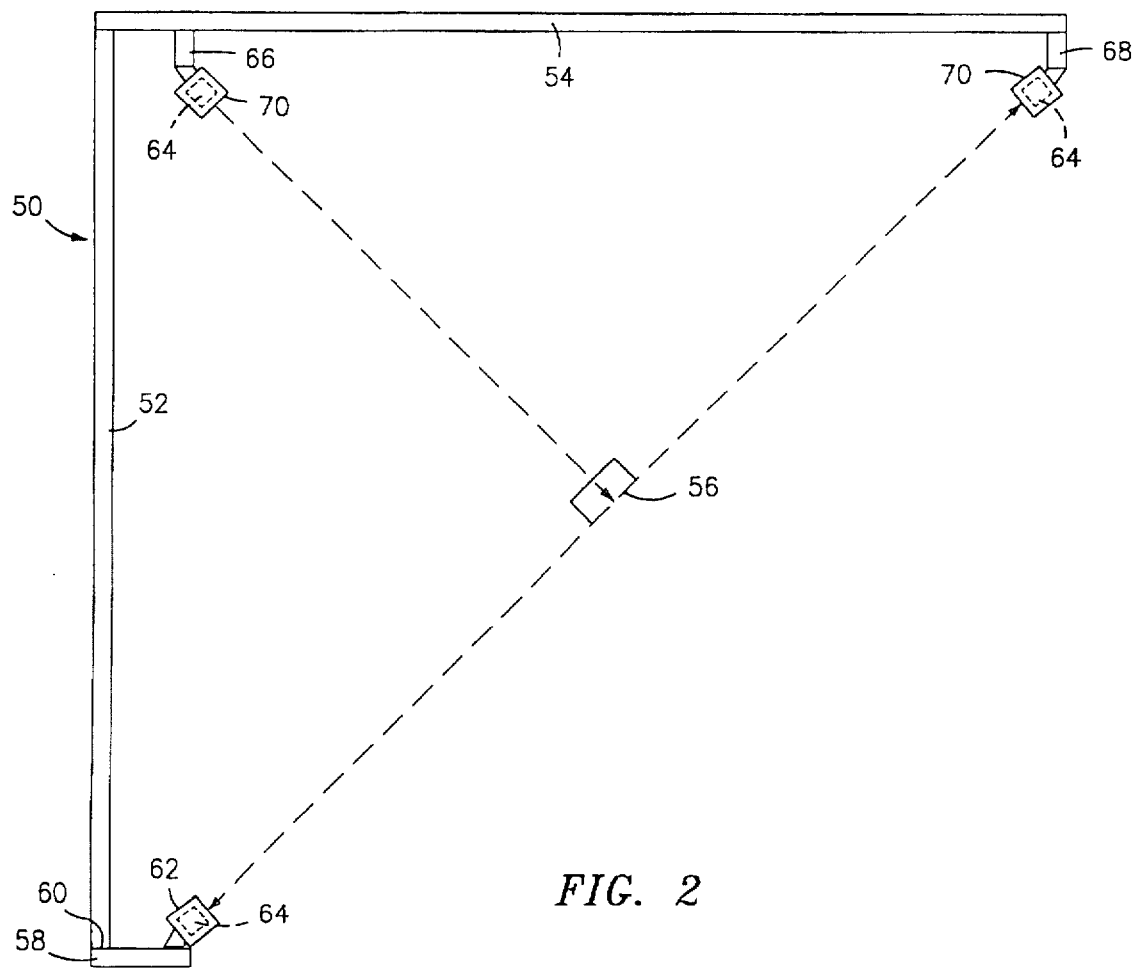
FIG. 2 illustrates an alternative embodiment of a system for studying, identifying and characterizing the temperature gradients in a volume of water.

Referring now to FIG. 2, a frame 50 is illustrated for studying scattering in the perpendicular Bragg direction. Using the frame 50, the scattering isotropy of the scattering producing field is examined. This technique is interesting in that it can to be used to distinguish targets. As shown in FIG. 2, the frame 50 has a first section of PVC tubing 52 mounted perpendicular to a second section of PVC tubing 54. The tubing sections 52 and 54 are connected to each other in a standard fashion using known connectors. The first tubing section 52 extends below the scattering Volume area 56 to one side.

A relatively short section of PVC tubing 58 is connected to the lower end 60 of the tubing section 52 using an elbow or other form of connector. A connector section 62 is joined to the end of tubing section 58. Housed in the interior of the connector section 62 is an acoustic transducer 64 which is focussed towards the area 56.

Two short sections 66 and 68 of PVC tubing are connected perpendicularly to the tubing section 54. The sections 66 and 68 may be joined to the tubing section 54 in any desired manner. Each of the sections 66 and 68 has a connector 70 attached to an end. Each connector 70 houses an acoustic transducer 64 within its interior. Each acoustic transducer 64 is focussed at the area 56.

One of the advantages to the frame 50 is that most of the frame remains above the scattering volume under study. This helps minimize turbulence caused by interference of the flow field.

Figure 3:
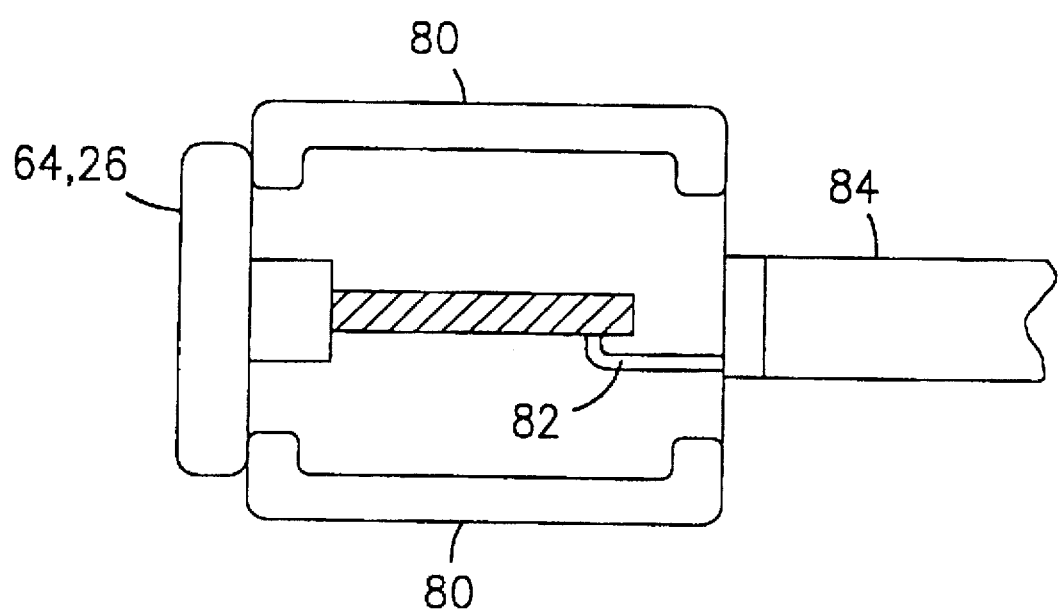
FIG. 3 illustrates a transducer which can be used in the system of either FIG. 1 or FIG. 2

The transducers 26 and 64 used in the frames 10 and 50 are preferably modified, as shown in FIG. 3, so that the outer metal case 80 of the transducer 26, 64 is isolated from the internal circuit ground 82. Additionally, each transducer is connected to a double shielded cable 84 to minimize ground loop effects.

The frames of the present invention can be assembled with PVC cement for permanent connections. They can also consist of subsections which are bolted together for ease of transport and shipping. Due to the light weight of the PVC materials, even a large frame should be easily deployable by one person. A single frame can contain more than one experimental setup. Still further, the frame can be easily modified as needed.

The PVC materials used to form the frame are beneficial in that they will holdup extremely well in a salt water environment with negligible decay over time. There are many reasons for using PVC tubing to form the frames in the system of the present invention. The key properties include the tubular nature to minimize interference effects, the light weight the ease of assembly and modification, and the imperviousness to salt water. Another type of material may be used if it meets these criteria.

In operation, the frame 10 or 50 is deployed in the open waters. Once deployed, a measurement is taken using the transducers 26 or 64. The type of data taken is a measurement in which the scattered signal is range gated at the center of the scattering volume and digitized. The transmit signal may consist of a single-cycle waveform with a center frequency of 500 kHz, amplified by a 2 kW power amplifier. The transducer 26 or 64 may have a 10 dB downpoint bandwidth of 500 kHz i. e. 250 to 750 kHz At time t=0, a first acoustic transducer source 26 or 64 transmits the single-cycle signal. A second acoustic transducer 26 or 64 acting as a receiver is range gated at the center of the scattering volume and the received signal is digitized at 5 MHz. The received waveforms are stored in place onboard a data acquisition system and off loaded after the completion of the experiment. Since the scattering field is, in general, time dependent, it is generally necessary to measure the scattering for a second source/receiver pair as near as simultaneous as possible with the first source/receiver pair. If desired, the receiver for each pair can be the same acoustic transducer. A transmit time for the second acoustic transducer source at t=5 msec after that of the first source is sufficiently small to ensure that the second source/receiver pair interrogates the same scattering field as the first source/receiver pair. A system repetition interval may be chosen at 15 msec. If desired, this cycle can be repeated 1023 times for a total of approximately 15 seconds of scattering data.

The data may thereafter be analyzed to study, identify and characterize the thermal gradients in the volume of water under study.

It is apparent that there has been provided in accordance with the present invention a portable acoustic turbulence detector which fully satisfies the means, objects and advantages set forth hereinbefore. While the invention has been described in combination with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims.

What is claimed is:

1. A system for studying, identifying and characterizing thermal gradients in a volume of water, which system comprises:

a frame to be deployed within said volume of water, said frame including a first tubular section formed from polyvinylchloride, said first tubular section extending below a scattering volume;

a first connector element joined to said first tubular section;

a first acoustic transducer forming part of a means for studying, identifying and characterizing said thermal gradients housed within said first connector element;

said frame further including a second tubular section formed from polyvinylchloride attached perpendicularly to said first tubular section;

second and third connector elements joined to said second tubular section; and second and third acoustic transducers forming part of said means for studying, identifying and characterizing said thermal gradients housed within said second and third connector elements, said second and third connector elements and said second and third acoustic transducers being positioned above said scattering volume.

2. A system for studying, identifying, and characterizing temperature gradients within a volume of water, said system comprising:

a frame having a plurality of components each formed from a lightweight material;

means for studying, identifying, and characterizing said temperature gradients comprising a pair of sensors; and said plurality of components including a plurality of tubing sections and first and second components, joined to said tubing sections, with a first one of said sensors being located within said first component and said second one of said sensors being located within said second component.

3. The system of claim 2 wherein said first and second components each comprise a connector element joined to said tubing sections.

4. The system of claim 3 wherein said plurality of components are formed from polyvinylchloride.

5. The system of claim 2 wherein each sensor comprises an acoustic transducer having an outer metal case isolated from an internal circuit ground.

6. The system of claim 5 further comprising a double shielded cable for minimizing ground loop effects joined to each acoustic transducer.

7. A system for studying, identifying, and characterizing temperature gradients within a volume of water, said system comprising:

a frame having a plurality of components each formed from a lightweight material;

means for studying, identifying, and characterizing said temperature gradients comprising a plurality of acoustic transducers focused below the frame so that water flow in an area of interest remains unobstructed; and said plurality of components including first and second components with a first one of said transducers being located within said first component and said second one of said transducers being located within said second component.

8. The system of claim 7 wherein said plurality of components includes one tubular component which extends below a scattering volume to one side and a plurality of tubing sections which are positioned above the scattering volume.

9. The system of claim 8 wherein said sensors include a first acoustic transducer housed within a connector element attached to said one tubular component and at least two acoustic transducers housed within connector elements attached to said plurality of tubing sections positioned above the scattering volume.

10. A system for studying, identifying and characterizing temperature gradients in a volume of water, which system comprises:

a frame having a central section formed from a section of polyvinylchloride tubing and a plurality of arm sections formed from polyvinylchloride tubing, said plurality of arm sections being joined to said central section and extending perpendicularly to said central section;

a connector element attached to each of said arm sections; and an acoustic transducer snugly fitted within each connector element, each of said acoustic transducers being aimed at a common point in said volume of water.

* * * * *